United States Patent
Millar et al.

(10) Patent No.: US 10,918,031 B2
(45) Date of Patent: Feb. 16, 2021

(54) SYSTEMS AND METHODS FOR MEASURING GROWTH OF A PLANT IN AN ASSEMBLY LINE GROW POD

(71) Applicant: Grow Solutions Tech LLC, Lehi, UT (US)

(72) Inventors: Gary Bret Millar, Highland, UT (US); Michael Stephen Hurst, Farmington, UT (US)

(73) Assignee: Grow Solutions Tech LLC, Vineyard, UT (US)

( * ) Notice: Subject to any disclaimer, the term of this patent is extended or adjusted under 35 U.S.C. 154(b) by 311 days.

(21) Appl. No.: 15/985,503

(22) Filed: May 21, 2018

(65) Prior Publication Data

US 2018/0359974 A1 Dec. 20, 2018

Related U.S. Application Data

(60) Provisional application No. 62/519,660, filed on Jun. 14, 2017.

(51) Int. Cl.
*A01G 31/04* (2006.01)
*A01G 9/08* (2006.01)
(Continued)

(52) U.S. Cl.
CPC .......... *A01G 31/042* (2013.01); *A01G 9/081* (2013.01); *A01G 9/088* (2013.01); *A01G 9/14* (2013.01);
(Continued)

(58) Field of Classification Search
CPC .... A01G 31/042; A01G 31/045; A01G 9/088; A01G 9/081; A01G 9/143; A01G 31/04;
(Continued)

(56) References Cited

U.S. PATENT DOCUMENTS

| 8,850,742 | B2 | 10/2014 | Dube |
| 10,390,504 | B2* | 8/2019 | Dufresne ............ B65G 1/026 |
| 2014/0259920 | A1 | 9/2014 | Wilson |
| 2017/0142912 | A1* | 5/2017 | Gasmer ............... A01G 9/025 |

(Continued)

FOREIGN PATENT DOCUMENTS

| GB | 2121263 A | 12/1983 |
| JP | 4534464 B2 | 9/2010 |

(Continued)

OTHER PUBLICATIONS

International Search Report and Written Opinion for PCT/US2018/034396 dated Sep. 21, 2018, 19 pages.

*Primary Examiner* — Kristen C Hayes
(74) *Attorney, Agent, or Firm* — Dinsmore & Shohl LLP

(57) ABSTRACT

An assembly line grow system for measuring growth of a plant, includes a rail system, carts moving along the rail system and carrying plants, seeds, or both, weight sensors, a proximity sensor, a camera and a master controller. The master controller is communicatively coupled to the carts, the weight sensors, the proximity sensor, and the camera. The master controller is operable to receive information from the weight sensors, the proximity sensor, and the camera, determine a growth state of a selected plant based on the information indicative of weight, color, height, or a combination thereof, and control a dosage supply component to provide a modified dosage based on the growth state.

14 Claims, 7 Drawing Sheets

(51) Int. Cl.
  *A01G 9/14* (2006.01)
  *G01G 11/04* (2006.01)
  *G01N 5/02* (2006.01)
  *G01N 21/31* (2006.01)
  *G01N 21/25* (2006.01)
  *G01N 21/17* (2006.01)
  *G01N 21/84* (2006.01)

(52) U.S. Cl.
  CPC ............ *A01G 9/143* (2013.01); *A01G 31/04* (2013.01); *G01G 11/043* (2013.01); *G01N 5/02* (2013.01); *G01N 21/314* (2013.01); *G01N 21/251* (2013.01); *G01N 2021/1776* (2013.01); *G01N 2021/8416* (2013.01); *G01N 2021/8466* (2013.01)

(58) Field of Classification Search
  CPC . A01G 31/06; A01G 9/00; A01G 9/14; A01G 9/24
  See application file for complete search history.

(56) References Cited

U.S. PATENT DOCUMENTS

| | | | |
|---|---|---|---|
| 2018/0007850 A1* | 1/2018 | Dufresne | B65G 1/026 |
| 2019/0029200 A1* | 1/2019 | Mawendra | A01G 20/30 |
| 2019/0133064 A1* | 5/2019 | Fyvolent | A01G 7/045 |
| 2019/0208711 A1* | 7/2019 | Sahu | A01G 31/06 |
| 2019/0281771 A1* | 9/2019 | Setton | A01G 9/249 |
| 2019/0382211 A1* | 12/2019 | Buberman | B25J 11/00 |
| 2020/0012852 A1* | 1/2020 | Ding | G06K 9/6274 |
| 2020/0100445 A1* | 4/2020 | Saba | G06F 7/00 |

FOREIGN PATENT DOCUMENTS

| | | | | |
|---|---|---|---|---|
| NL | 9201632 A | * | 4/1994 | ............ A01G 9/143 |
| WO | WO201161635 A2 | | 5/2011 | |
| WO | 2013/066254 A1 | | 5/2013 | |
| WO | WO2013066254 A1 | | 5/2013 | |
| WO | 2014/066844 A2 | | 5/2014 | |
| WO | WO2014196744 A1 | | 12/2014 | |
| WO | 2016/138075 A1 | | 9/2016 | |
| WO | WO201802647 A1 | | 1/2018 | |
| WO | WO-2018119407 A1 | * | 6/2018 | ............ B25J 9/1679 |

* cited by examiner

US 10,918,031 B2

SYSTEMS AND METHODS FOR MEASURING GROWTH OF A PLANT IN AN ASSEMBLY LINE GROW POD

CROSS REFERENCE

This application claims the benefit of U.S. Provisional Application Ser. No. 62/519,660, filed on Jun. 14, 2017, which is incorporated by reference in its entirety.

TECHNICAL FIELD

Embodiments described herein generally relate to systems and methods for measuring growth of a plant in a grow pod and, more specifically, to measuring growth of a plant in a grow pod based on a weight, a color, a chlorophyll level, and/or a height of the plant.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food. Accordingly, there is a need to provide an organized plant grow pod system which facilitates a quick growing, small footprint, chemical free, low labor solution to growing microgreens and other plants for harvesting.

At the same time, there is a need that the organized plant grow pod system may provide controlled and optimal environmental conditions (e.g., the timing and wavelength of light, pressure, temperature, watering, nutrients, molecular atmosphere, and/or other variables) in order to maximize plant growth and output. In particular, it is important to monitor and check growth patterns and growth status of plants or seeds in order to provide individual and customized care for each plant or seed and take proper measure for plants or seeds experiencing growth problems.

SUMMARY

Systems and methods for measuring growth of a plant in an assembly line grow pod are described. One embodiment of a system for measuring growth of a plant includes a plurality of carts, a group of sensors and a master controller. The plurality of carts is moving along a rail and carrying plants and seeds. The group of sensors is arranged in or around an assembly line grow pod and includes at least a weight sensor, a proximity sensor and a camera. The master controller is communicatively coupled to the group of sensors and including a processor and a memory for storing a master recipe, a plurality of threshold growth index values associated with plants, and a predetermined program. The master recipe includes a set of customized instructions that dictate a dosage supply relevant to growth of plants, seeds, or both. The program, upon execution by the processor, performs operations comprising: (i) receiving information indicative of growth state of a selected plant from the group of sensors; (ii) identifying the selected plant; (iii) retrieving a threshold growth index value associated with the selected plant; (iv) comparing the information indicative of growth state of the selected plant with the threshold growth index value; (v) determining that the growth state of the selected plant is normal, overgrowth, or undergrowth; and (vi) upon determination that the growth state of the selected plant is overgrowth, or undergrowth, modifying the master recipe accordingly.

The information indicative of growth state of the selected plant includes a weight of the selected plant, a height of the selected plant, a chlorophyll level of the selected plant, or a combination thereof. The predetermined program, upon execution by the processor, performs operations further including (i) receiving the weight of the selected plant from the weight sensor; (ii) retrieving a threshold weight index value associated with the selected plant; (iii) comparing the weight against the threshold weight index value; and (iv) determining that the growth state of the selected plant is normal, overgrowth, or undergrowth.

In another embodiment, the predetermined program, upon execution by the processor, performs operations further including (i) receiving a distance between the proximity sensor and the selected plant from the proximity sensor; (ii) determining the height of the selected plant based on the distance; (iii) retrieving a threshold height index value associated with the selected plant; (iv) comparing the height against the threshold height index value; and (v) determining that the growth state of the selected plant is normal, overgrowth, or undergrowth.

In another embodiment, the predetermined program, upon execution by the processor, performs operations further including (i) receiving a captured image the selected plant from the camera; (ii) determining the chlorophyll level of the selected plant based on the captured image; (iii) retrieving a threshold chlorophyll level index value associated with the selected plant; (iv) comparing the determined chlorophyll level against the threshold chlorophyll index value; and (v) determining that the growth state of the selected plant is normal, overgrowth, or undergrowth.

In another embodiment, the predetermined program, upon execution by the processor, performs operations further including: upon determination that the growth state of the selected plant is normal, determining that the selected plant is ready for harvesting. The predetermined program, upon execution by the processor, performs operations further including: (i) upon determination that the growth state of the selected plant is overgrowth, modifying the master recipe relevant to the selected plant to reduce a dosage supply; and (ii) causing a dosage control component to provide the selected plant with the reduced dosage supply. The predetermined program, upon execution by the processor, performs operations further including (i) upon determination that the growth state of the selected plant is undergrowth, modifying the master recipe relevant to the selected plant to increase a dosage supply; and (ii) causing a dosage control component to provide the selected plant with the increased dosage supply.

In another embodiment, an assembly line grow system for measuring growth of a plant, includes a rail system, carts moving along the rail system and carrying plants, seeds, or both, weight sensors, a proximity sensor, a camera and a master controller. The weight sensors are arranged on the carts and operable to measure weight of a payload of each cart. The proximity sensor is positioned over the carts and operable to detect an object within a predetermined distance. The camera is positioned over the carts and operable to capture an image of the plants in the carts. The master controller is communicatively coupled to the carts, the weight sensors, the proximity sensor, and the camera. The master controller is operable to receive information from the weight sensors, the proximity sensor, and the camera and determine a growth state of a selected plant based on the information indicative of weight, color, height, or a combination thereof.

In another embodiment, the master controller is further operable to: receive data relating to a selected plant which are output from the weight sensors, the proximity sensor, and the camera; and process the data relating to the selected plant and determine weight, color, and height of the selected plant. The master controller is further operable to: based on the growth state of the selected plant, determining that the selected plant is to be transported to a harvest component. The master controller is further operable to: based on the growth state of the selected plant, modify a dosage supply relevant to the selected plant and control a dosage supply component based on the modified dosage supply.

In another embodiment, the master controller includes a processor and a memory for storing a master recipe that contains dosage supply instructions and upon determination of an overgrowth state of the selected plant, the master controller modifies the dosage supply instructions relating to the selected plant to reduce dosage. In another embodiment, the master controller includes a processor and a memory for storing a master recipe that contains dosage supply instructions and upon determination of an undergrowth state of the selected plant, the master controller modifies the dosage supply instructions relating to the selected plant to increase dosage.

In yet another embodiment, a method for measuring growth of a plant in an assembly line grow pod includes (i) arranging a group of sensors in or around an assembly line grow pod, the group of sensors comprising at least a weight sensor, a proximity sensor and a camera; (ii) receiving information indicative of growth state of a selected plant from the group of sensors; (iii) identifying the selected plant; (iv) retrieving a threshold growth index value associated with the selected plant; (v) comparing the information indicative of growth state of the selected plant with the threshold growth index value; (vi) determining that the growth state of the selected plant is normal, overgrowth, or undergrowth; and (vii) upon determination that the growth state of the selected plant is overgrowth, or undergrowth, modifying the master recipe accordingly.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for measuring growth of a plant in a grow pod. Some embodiments are configured with a grow pod that includes a rail system, a cart moving along the rail system, a sensor configured to measure at least one of a weight, a color, and a height of plants in the cart, and a master controller. The master controller identifies plants in the cart, receives data from the sensor, determines growth of the plants based on the at least one of the weight, the color, and the height, and outputs a notification that the plants are ready to harvest based on the growth of the plants. The systems and methods for measuring growth of a plant in a grow pod incorporating the same will be described in more detail, below.

Figure 1:
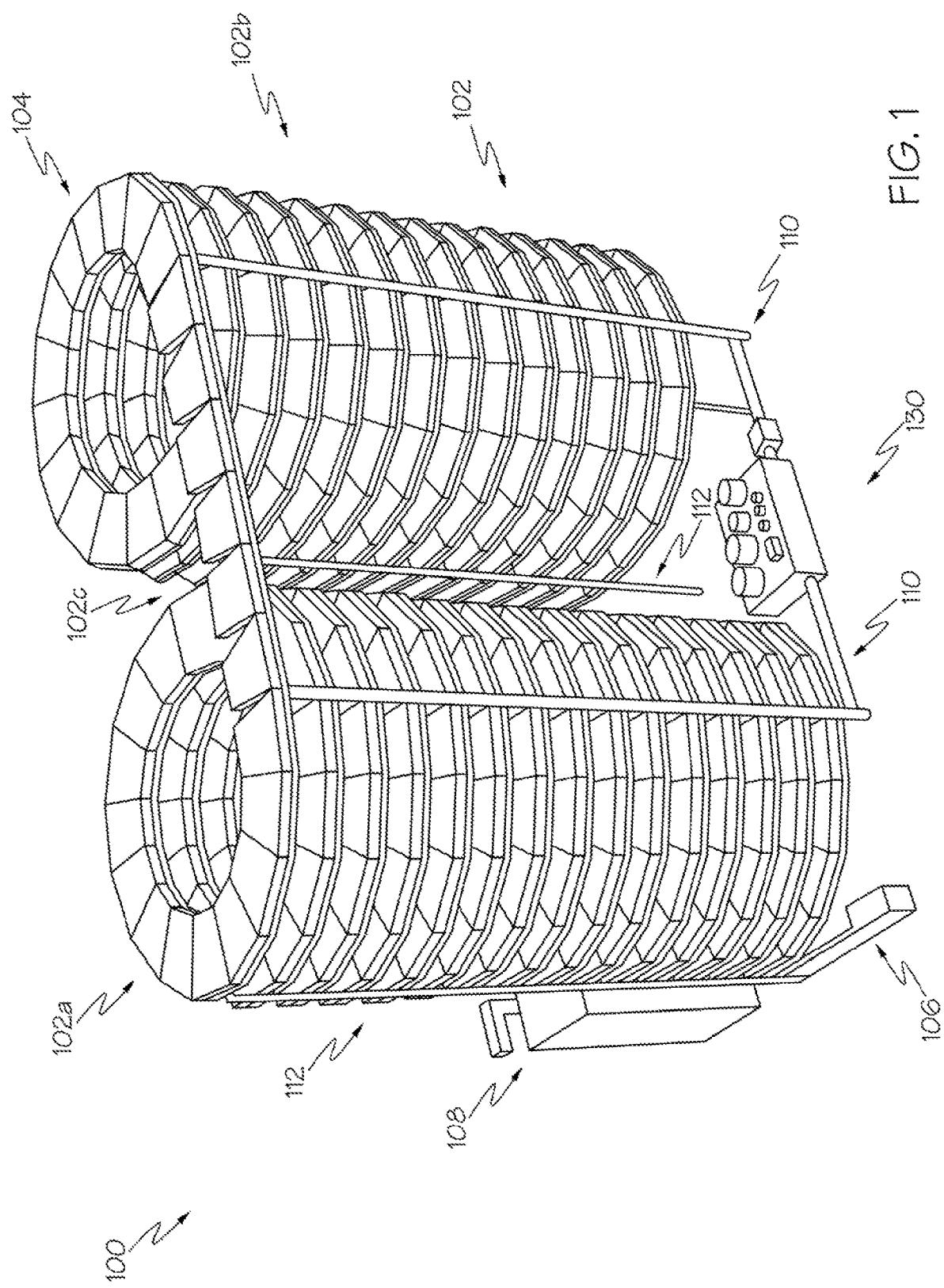
FIG. 1 depicts an assembly line grow pod, according to embodiments described herein.

Referring now to the drawings, FIG. 1 depicts an assembly line grow pod 100, according to embodiments described herein. As illustrated, the assembly line grow pod 100 may include a track 102 that holds one or more carts 104. The track 102 may include an ascending portion 102a, a descending portion 102b, and a connection portion 102c. The track 102 may wrap around (in a counterclockwise direction in FIG. 1) a first axis such that the carts 104 ascend upward in a vertical direction. The connection portion 102c may be relatively level (although this is not a requirement and is utilized to transfer carts 104 to the descending portion 102b. The descending portion 102b may be wrapped around a second axis (again in a counterclockwise direction in FIG. 1) that is substantially parallel to the first axis, such that the carts 104 may be returned closer to ground level.

While not explicitly illustrated in FIG. 1, the assembly line grow pod 100 may also include a plurality of lighting devices, such as light emitting diodes (LEDs). The lighting devices may be disposed on the track 102 opposite the carts 104, such that the lighting devices direct light waves to the carts 104 on the portion the track 102 directly below. In some embodiments, the lighting devices are configured to create a plurality of different colors and/or wavelengths of light, depending on the application, the type of plant being grown, and/or other factors. While in some embodiments, LEDs are utilized for this purpose, this is not a requirement. Any lighting device that produces low heat and provides the desired functionality may be utilized.

Also depicted in FIG. 1 is a master controller 106. The master controller 106 may include a computing device and/or other hardware for controlling various components of the assembly line grow pod 100. As an example, a water distribution component, a nutrient distribution component, an air distribution component, etc. may be included as part of the master controller 106.

In some embodiments, the master controller 106 may store a master recipe for plants that may dictate the timing and wavelength of light, pressure, temperature, watering, nutrients, molecular atmosphere, and/or other variables the optimize plant growth and output. For example, the master recipe dictates lighting requirements on the third day of a particular plant at the assembly line grow pod 100, different lighting requirements on the fourth day of the plant, etc. As another example, the master recipe dictates watering needs, nutrient feeds, etc. directed to plants carried on the carts at particular locations for a particular day counted from the date that plants are introduced in to the assembly line grow pod 100. The master recipe is specific, extensive and customized to cover plants supported by the assembly line grow pod 100. By way of example only, the recipe may have instructions to assist 1500 carts simultaneously operating in the assembly line grow pod 100 and carrying diverse population of plants. In some embodiments, the master controller 106 may store specific recipes such as a watering recipe, a nutrient recipe, a dosage recipe, a wave recipe, a temperature recipe, a pressure recipe, etc.

In some embodiments, the master recipe may take any form of a structured set of data, a database, etc. such that data is organized into rows, columns, and table. Additionally, or alternatively, the master recipe may be structured to facilitate the storage, retrieval, modification, addition, and deletion of data through data processing operations.

In some embodiments, the master controller 106 reads information from the master recipe and adjust the information based on known locations of plants at the assembly line grow pod 100. For example, the master controller 106 may identify the plants location based on a cart identifier which is indicative of the growth stage of the plants in the assembly line grow pod 100. Once plants enter into the assembly line grow pod 100, plants move along the spiral tracks from the ascending side to the descending side until plants arrive at the harvest stage. Thus, the location of the carts carrying plants may indicate the growth stage of plants at the assembly line grow pod 100. Then, the master controller 106 may apply the master recipe relevant to the stage of the plants, such as lighting, watering, pressure, and/or wave requirements, specific to plants growing on the fourth day at the assembly line grow pod 100.

The master controller 106 processes the master recipe and controls various components of the assembly line grow pod 100. To reduce the processing load, for example, processing the master recipe and all related events for a large number of simultaneously operating carts carrying the diverse population of plants, the master controller 106 may distribute different and specific functions to several control modules, such as a valve controller, a dosage controller, a pump controller, etc. These control modules work autonomously, complete task(s) and report to the master controller 106. In some embodiments, the control modules may be configured as hardware modules with their own set of instructions in order to improve stability and avoid pushed updates and modifications. In other embodiments, other configurations of the control modules are available.

Figure 2:
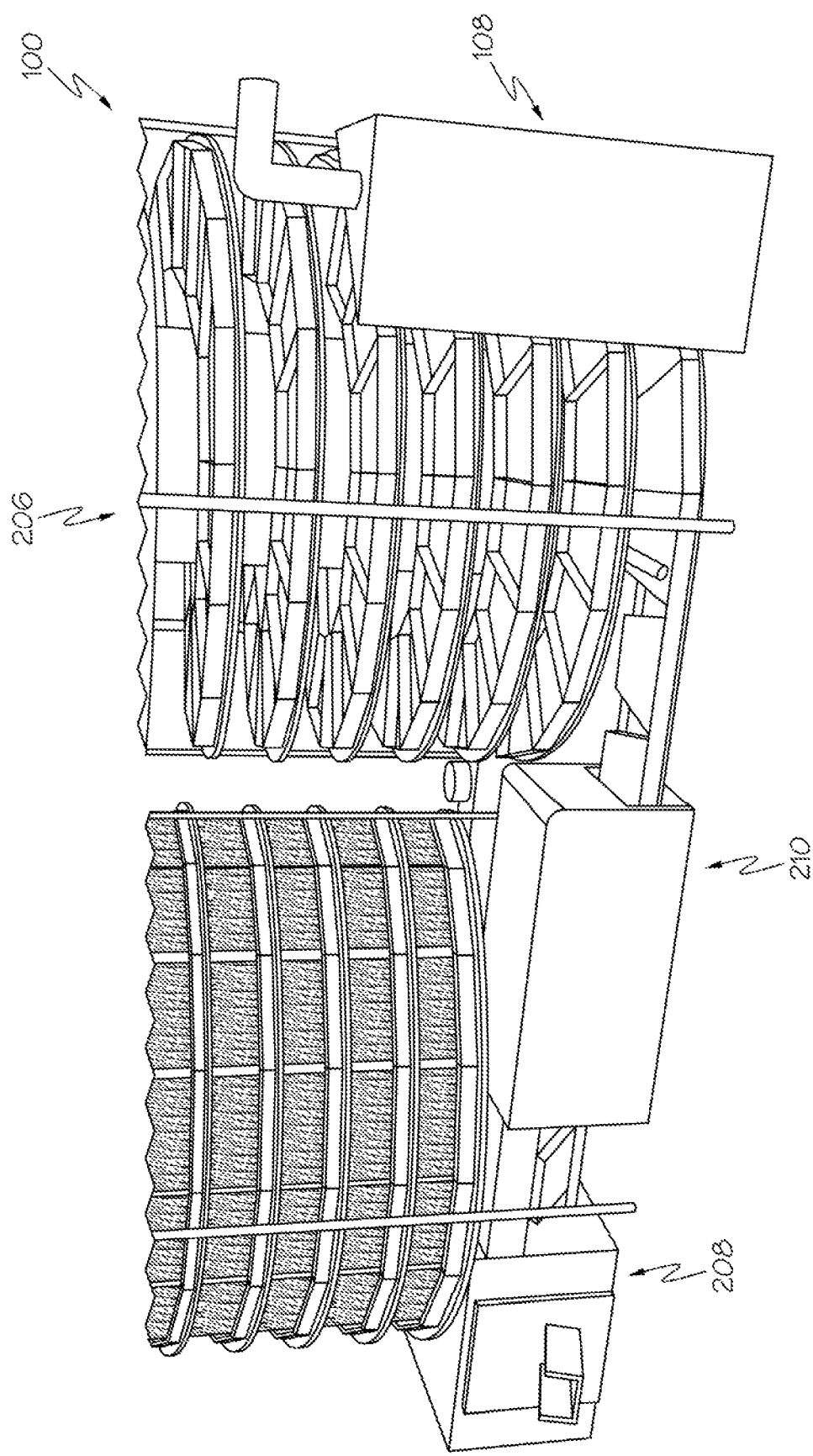
FIG. 2 depicts a plurality of components for an assembly line grow pod, according to embodiments described herein.

Coupled to the master controller 106 is a seeder component 108, as shown in FIGS. 1 and 2. The seeder component 108 may be configured to seed one or more carts 104 as the carts 104 pass the seeder in the assembly line. Depending on the particular embodiment, each cart 104 may include a single section tray for receiving a plurality of seeds. Some embodiments may include a multiple section tray for receiving individual seeds in each section (or cell). In the embodiments with a single section tray, the seeder component 108 may detect presence of the respective cart 104 and may begin laying seed across an area of the single section tray. The seed may be laid out according to a desired depth of seed, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged.

In the embodiments where a multiple section tray is utilized with one or more of the carts 104, the seeder component 108 may be configured to individually insert seeds into one or more of the sections of the tray. Again, the seeds may be distributed on the tray (or into individual cells) according to a desired number of seeds, a desired area the seeds should cover, a desired depth of seeds, etc.

The watering component may be coupled to one or more water lines 110, which distribute water and/or nutrients to one or more trays at predetermined areas of the assembly line grow pod 100. In some embodiments, seeds may be sprayed to reduce buoyancy and then flooded. Additionally, water usage and consumption may be monitored, such that at subsequent watering stations, this data may be utilized to determine an amount of water to apply to a seed at that time.

Also depicted in FIG. 1 are airflow lines 112. Specifically, the master controller 106 may include and/or be coupled to one or more components that delivers airflow for temperature control, pressure, carbon dioxide control, oxygen control, nitrogen control, etc. Accordingly, the airflow lines 112 may distribute the airflow at predetermined areas in the assembly line grow pod 100.

It should be understood that while the embodiment of FIG. 1 depicts an assembly line grow pod 100 that wraps around a plurality of axes, this is merely one example. Any configuration of assembly line or stationary grow pod may be utilized for performing the functionality described herein.

FIG. 2 depicts a plurality of components for an assembly line grow pod 100, according to embodiments described herein. As illustrated in FIG. 2, the seeder component 108 is illustrated, as well as a lighting device 206, a harvester component 208, and a sanitizer component 214. As described above, the seeder component 108 may be configured to seed the trays of the carts 104. The lighting devices 206 may provide light waves in one or more predetermined wavelengths that may facilitate plant growth. The lighting devices 206 are communicatively coupled to the master controller 106. The lighting devices 206 are disposed on the underside of the track 102 such that the lighting devices can illuminate crops in the carts traversing the track 102. Additionally, as the plants are lighted, watered, and provided nutrients, the carts 104 will traverse the track 102 of the assembly line grow pod 100. Additionally, the assembly line grow pod 100 may detect a growth and/or fruit output of a plant and may determine when harvesting is warranted. If harvesting is warranted prior to the cart 104 reaching the harvester, modifications to the master recipe may be made for that particular cart 104 until the cart 104 reaches the harvester. Conversely, if a cart 104 reaches the harvester and it has been determined that the plants in that cart 104 are not ready for harvesting, the assembly line grow pod 100 may commission that cart 104 for another lap. This additional lap may include a different dosing of light, water, nutrients, etc. and the speed of the cart could change, based on the development of the plants on the cart. If it is determined that the plants on a cart 104 are ready for harvesting, the harvester component 208 may facilitate that process.

In some embodiments, the harvester component 208 may simply cut the plants at a predetermined height for harvesting. In some embodiments, the tray may be overturned to remove the plants from the tray and into a processing container for chopping, mashing, juicing, etc. Because many embodiments of the assembly line grow pod 100 do not use soil, minimal (or no) washing of the plants may be necessary prior to processing.

Similarly, some embodiments may be configured to automatically separate fruit from the plant, such as via shaking, combing, etc. If the remaining plant material may be reused to grow additional fruit, the cart 104 may keep the remaining plant and return to the growing portion of the assembly line. If the plant material is not to be reused to grow additional fruit, it may be discarded or processed, as appropriate.

Once the cart 104 and tray are clear of plant material, the sanitizer component 210 may be implemented to remove any particulate, plant material, etc. that may remain on the cart 104. As such, the sanitizer component 210 may implement any of a plurality of different washing mechanisms, such as high pressure water, high temperature water, and/or other solutions for cleaning the cart 104 and/or tray. In some embodiments, the tray may be overturned to output the plant for processing and the tray may remain in this position. As such, the sanitizer component 210 may receive the tray in this position, which may wash the cart 104 and/or tray and return the tray back to the growing position. Once the cart 104 and/or tray are cleaned, the tray may again pass the seeder, which will determine that the tray requires seeding and will begin the process of seeding.

Figure 3:
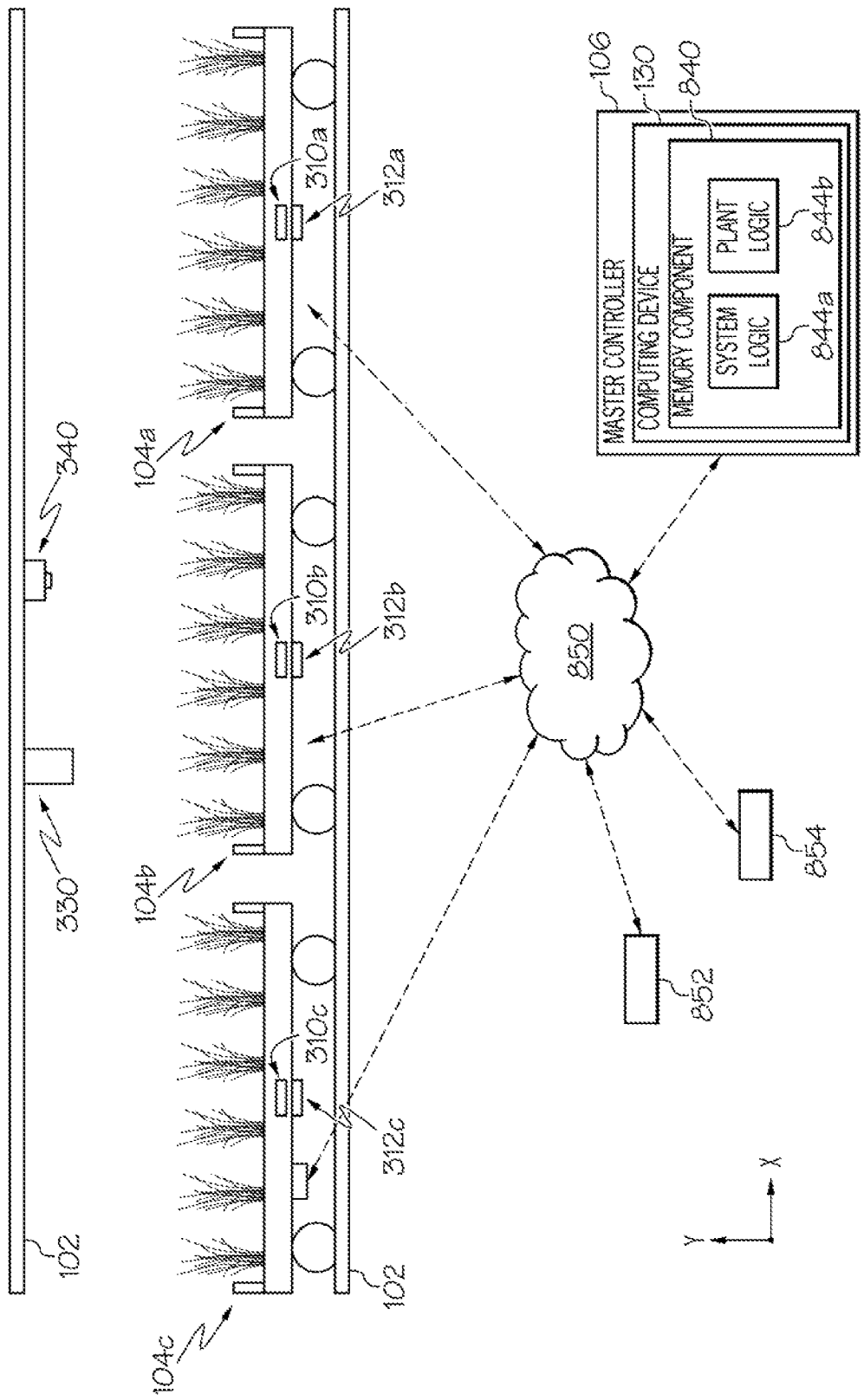
FIG. 3 depicts various sensors and related systems for determining growth of plants in carts, according to embodiments described herein.

FIG. 3 depicts a system for determining growth of plants in carts, according to embodiments described herein. Carts 104a, 104b, and 104c move along the track 102 in +x direction. While the track 102 is illustrated as a straight track in FIG. 3, the track 102 may be a curved track. The carts 104a, 104b, and 104c include weight sensors 310a, 310b, and 310c, respectively. The weight sensors 310a, 310b, and 310c are configured to measure the weight of a payload on the carts, such as plants. The carts 104a, 104b, and 104c also include cart computing devices 312a, 312b, and 312c, respectively. The cart computing devices 312a, 312b, and 312c may be communicatively coupled to the weight sensors 310a, 310b, and 310c and receive weight information from the weight sensors 310a, 310b, and 310c. The cart computing devices 312a, 312b, and 312c may have a wireless network interface for communicating with the master controller 106 through a network 850. In some embodiments, each of the carts 104a, 104b, and 104c may include a plurality of weight sensors. The plurality of weight sensors may determine weights of individual cells or plants on the carts.

In some embodiments, a plurality of weight sensors may be placed on the track 102. The weight sensors are configured to measure the weights of the carts on the track 102 and transmit the weights to the master controller 106. The master controller 106 may determine the weight of plants on a cart by subtracting the weight of the cart from the weight received from the weight sensors on the track 102.

A proximity sensor 330 may be positioned over the carts 104a, 104b, and 104c. In embodiments, the proximity sensor 330 may be attached under the track 102. The proximity sensor 330 may be configured to detect a distance between the proximity sensor 330 and the plants. For example, the proximity sensor 330 may transmit waves and receive waves reflected from the plants. Based on the travelling time of the waves, the proximity sensor 330 may determine the distance between the proximity sensor and the plants. In some embodiments, the proximity sensor 330 may be configured to detect an object within a certain distance. For example, the proximity sensor 330 may detect the plants in the carts 104b if the plants are within a certain distance (e.g., 5 inches) from the proximity sensor 330. The proximity sensor 330 may have wireless network interface for communicating with the master controller 106 through a network 850. In some embodiments, multiple proximity sensors may be available.

A camera 340 may be positioned over the carts 104a, 104b, and 104c. In embodiments, the camera 340 may be attached under the track 102. The camera 340 may be configured to capture an image of the plants in the cart 104b. The camera 340 may have a wide angle lens to capture plants of more than one cart. For example, the camera 340 may capture the images of the plants in the carts 104a, 104b, and 104c. The camera 340 may include a special filter that filters out artificial LED lights from lighting devices in the assembly line grow pod 100 such that the camera 340 may capture the natural colors of the plants. The camera 340 may have wireless network interface for communicating with the master controller 106 through a network 850. In some embodiments, multiple cameras may be available.

The master controller 106 may include a computing device 130. The computing device 130 may include a memory component 840, which stores systems logic 844a and plant logic 844b. As described in more detail below, the systems logic 844a may monitor and control operations of one or more of the components of the assembly line grow pod 100. For example, the systems logic 844a may monitor and control operations of the light devices, the water distribution component, the nutrient distribution component, the air distribution component. The plant logic 844b may be configured to determine and/or receive a recipe for plant growth and may facilitate implementation of the recipe via the systems logic 844a.

Additionally, the master controller 106 is coupled to a network 850. The network 850 may include the internet or other wide area network, a local network, such as a local area network, a near field network, such as Bluetooth or a near field communication (NFC) network. The network 850 is also coupled to a user computing device 852 and/or a remote computing device 854. The user computing device 852 may include a personal computer, laptop, mobile device, tablet, server, etc. and may be utilized as an interface with a user.

Similarly, the remote computing device 854 may include a server, personal computer, tablet, mobile device, etc. and may be utilized for machine to machine communications. As an example, if the master controller 106 determines a type of seeds being used (and/or other information, such as ambient conditions), the master controller 106 may communicate with the remote computing device 854 to retrieve a previously stored recipe for those conditions. As such, some embodiments may utilize an application program interface (API) to facilitate this or other computer-to-computer communications.

Figure 4:
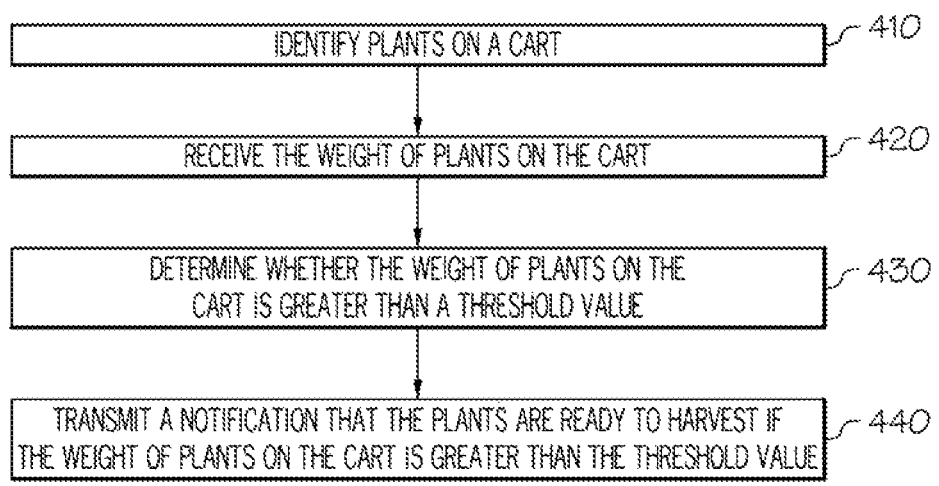
FIG. 4 depicts a flowchart for measuring growth of plants in a grow pod using weight sensors, according to embodiments described herein.

FIG. 4 depicts a flowchart for measuring growth of plants in a grow pod using weight sensors, according to embodiments described herein. At block 410, the master controller 106 identifies plants on a cart. In some embodiments, an operator inputs the type of seeds that need to be grown in the carts through the user computing device 852, and the master controller 106 receives the type of seeds from the user computing device 852. Accordingly, the master controller 106 may identify the type of seeds, plants, or both through an input from an operator. In other embodiments, the master controller 106 may obtain identification of plants from the seeder component 108 that seeds the plants on the carts. Additionally, or alternatively, the master controller 106 may determine that the carts 104a, 104b, and 104c carry plants A. More specifically, the master controller 106 may recognize identifiers of the carts 104a, 104b, and 104c which indicate plants carried by those carts, 104a, 104b and 104c, and additional information such as how long plants or seeds stay at the assembly line grow pod 100. Once plants or seeds are identified, the master controller 106 may identify the receipt correlated to and associated with the identified plants or seeds.

At block 420, the master controller 106 receives the weight of plants in the cart. For example, the weight sensor 310a measures the weight of the plants in the cart 104a as shown in FIG. 3, and transmits the weight value to the master controller 106 through the network 850 (FIG. 3). In other embodiments, weight sensors may be placed on the track 102. Accordingly, the weight sensors are configured to measure the weights of the carts on the track 102 and transmit the weights to the master controller 106. The master controller 106 may determine the weight of plants on a cart by subtracting the weight of the cart from the weight received from the weight sensors on the track 102.

At block 430, the master controller 106 determines whether the weight of plants in the cart is greater than a threshold value. In some embodiments, the threshold value may be an index value that indicates growth of plants, seeds, or both. The threshold value may be pre-stored and associated with type of plants, seeds, or both. The threshold value may be a weight of certain plants in a cart that are grown enough to be harvested. For example, the threshold value for the plants A may be 50 pounds per cart. The threshold value may be stored in the plant logic 844b, and the master controller 106 may retrieve the threshold value from the plant logic 844b.

At block 440, the master controller 106 transmits a notification that the plants are ready to harvest if the weight of plants in the cart is greater than the threshold value. For example, if plants A in the cart 104a weigh 50 pounds or more, the master controller may determine that the plants A in the cart 104a are ready to harvest, or fully grown. Then, the master controller 106 may transmit a notification that the plants A in the cart 104a are ready to harvest to the user computing device 852. In some embodiments, the master controller 106 may send a notification that the plants A in the cart 104a are ready to go to the harvester component 208. In some embodiments, the master controller 106 may control the lighting devices not to illuminate the cart 104a in order to prevent the plants A from overgrowing. In some embodiments, if plants A in the cart 104b weigh less than 50 pounds, the master controller may determine that the plants A in the cart 104b are not fully grown. The master controller 106 may control the lighting devices to increase the level of illumination to the cart 104b or control the nutrient distribution component to provide more nutrients to the cart 104b to facilitate the further growth of the plants A in the cart 104b.

As discussed above, the master controller 106 stores the master recipe and once the plants A are identified, the master controller 106 may determine growth environment and/or conditions correlated to the plants A. Upon detection of the growth status of the plants A based on the weight, the master controller 106 may modify the recipe correlated to the plants A to reflect the growth status.

Figure 5:
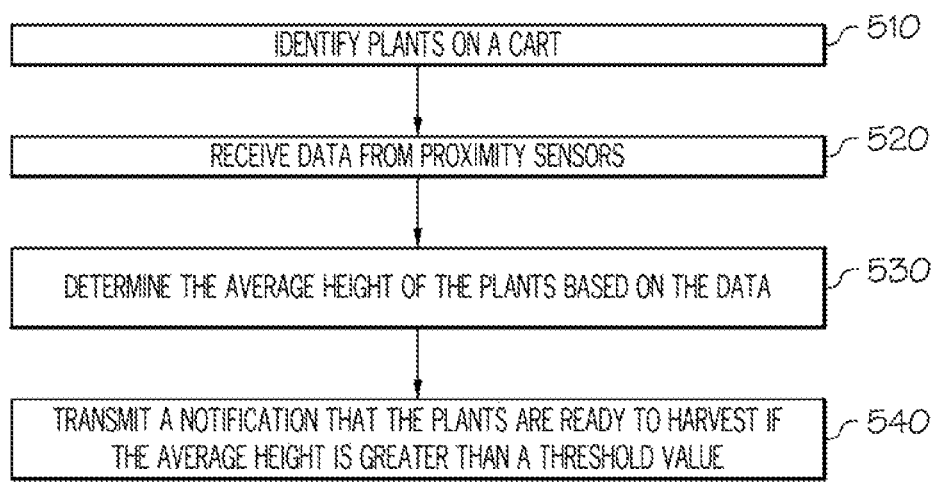
FIG. 5 depicts a flowchart for measuring growth of plants in a grow pod using proximity sensors, according to embodiments described herein.

FIG. 5 depicts a flowchart for measuring growth of plants in a grow pod using proximity sensors, according to embodiments described herein. At block 510, the master controller 106 identifies plants on a cart. For example, an operator inputs the type of seeds that need to be grown in the carts through the user computing device 852, and the master controller 106 receives the type of seeds from the user computing device 852. As another example, the master controller 106 may obtain identification of plants from the seeder component 108 that seeds the plants on the carts. In embodiments, the master controller 106 may determine that the carts 104a, 104b, and 104c carry plants A. As discussed above, the master controller 106 may recognize identifiers of the carts 104a, 104b, and 104c which indicate plants carried by those carts, 104a, 104b and 104c, and additional information such as how long plants or seeds stay at the assembly line grow pod 100. Once plants or seeds are identified, the master controller 106 may identify the receipt correlated to and associated with the identified plants or seeds.

At block 520, the master controller 106 receives data from proximity sensors. For example, the proximity sensor 330 determines the distance between the proximity sensor 330 and the plants in the cart 104b in a y-axis direction, and transmits the distance data to the master controller 106 through the network 850.

At block 530, the master controller 106 determines the average height of the plants based on the data from the proximity sensors. For example, the master controller 106 may receive a plurality of distance values from the proximity sensor 330 with respect to the cart 104b, and average the plurality of distance values. The master controller 106 may determine the average height of the plants by subtracting the average of the plurality of distance values from the distance between the proximity sensor 330 and the cart 104b. The distance between the proximity sensor 330 and the cart 104 may be pre-stored in the memory component 840. For example, if the average of the plurality of distance values for the cart 104b is 5 inches, and the distance between the proximity sensor 330 and the cart 104b is 20 inches, the average height of the plants would be determined as 15 inches.

At block 540, the master controller 106 transmits a notification that the plants are ready to harvest if the average height is greater than a threshold value. For example, if the average height of the plants A in the cart 104b is 15 inches, and the threshold value is 14 inches, the master controller may determine that the plants A in the cart 104b are ready to harvest, or fully grown. Then, the master controller 106 may transmit a notification that the plants A in the cart 104b are ready to harvest to the user computing device 852. In some embodiments, the master controller 106 may send a notification that the plants A in the cart 104b are ready to harvest to the harvester component 208. The master controller 106 may control the lighting devices not to illuminate the cart 104b in order to prevent the plants A from overgrowing. In some embodiments, if the average height of the plants A in the cart 104b is 13 inches, the master controller may determine that the plants A in the cart 104b are not fully grown. The master controller 106 may control the lighting devices to increase the level of illumination to the cart 104b or control the nutrient distribution component to provide more nutrients to the cart 104b to facilitate the further growth of the plants A in the cart 104b.

Figure 6:
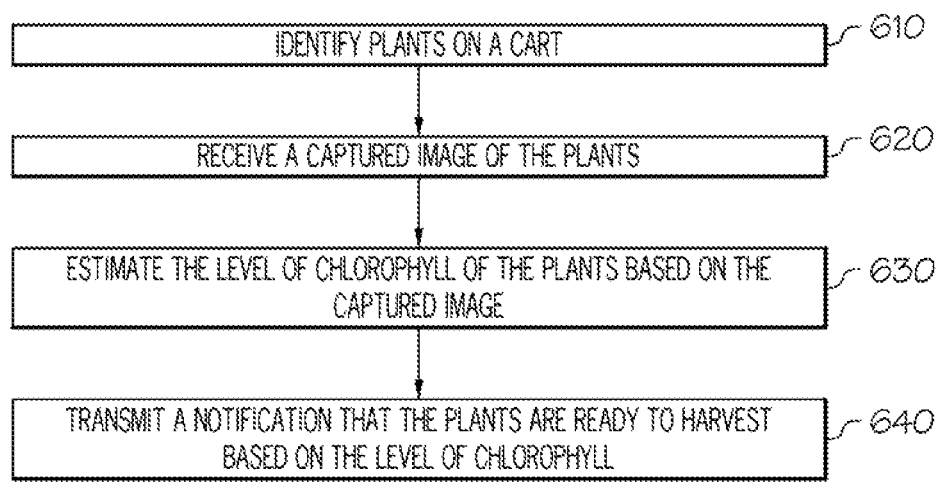
FIG. 6 depicts a flowchart for measuring growth of plants in a grow pod using a camera, according to embodiments described herein.

FIG. 6 depicts a flowchart for measuring growth of plants in a grow pod using a camera, according to embodiments described herein. At block 610, the master controller 106 identifies plants on a cart. For example, an operator inputs the type of seeds that need to be grown in the carts through the user computing device 852, and the master controller 106 receives the type of seeds from the user computing device 852. As another example, the master controller 106 may obtain identification of plants from the seeder component 108 that seeds the plants on the carts. In embodiments, the master controller 106 may determine that the carts 104a, 104b, and 104c carry plants A. The master controller 106 may recognize identifiers of the carts 104a, 104b, and 104c which indicate plants carried by those carts, 104a, 104b and 104c, and additional information such as how long plants or seeds stay at the assembly line grow pod 100. Once plants or seeds are identified, the master controller 106 may identify the receipt correlated to and associated with the identified plants or seeds.

At block 620, the master controller 106 receives a captured image of the plants on a cart from the camera 340. The camera 340 may capture plants in more than one cart using a wide angle lens. For example, the camera 340 may capture the image of the plants in the carts 104a, 104b, and 104c. The camera 340 may include a special filter that filters out artificial LED lights from lighting devices in the assembly line grow pod 100 such that the captured image illustrates the natural colors of the plants.

At block 630, the master controller 106 estimates the level of chlorophyll of the plants based on the captured image. For example, the master controller 106 may implement image processing on the captured image to estimate the level of chlorophyll of the plants. In other embodiments, the master controller 106 may process the captured image to evaluate color of the plants. For example, depending on type of plants, color may indicate ripeness of plants for harvest. In further other embodiments, the master controller 106 may process the captured image to evaluate the shape of the plants. Depending on type of plants, the entire shape of plants may indicate maturity of plants for harvest. Other information resulting from the captured image of plants, such as particular patterns, may be available to detect the growth status of plants. A pattern recognition image processing may be available to discern growth pattern, growth shape, etc.

At block 640, the master controller 106 transmits a notification that the plants are ready to harvest based on the level of chlorophyll. Chlorophyll breaks down as the plants go ripened. Thus, the master controller 106 may determine whether plants are ready to harvest based on the changing level of chlorophyll for the plants, type of plants, and/or other factors. For example, if it is determined that the level of chlorophyll for the plants A in the cart 104c becomes less than a predetermined value, the master controller 106 may determine that the plants are ready to harvest, and transmit a notification that the plants A in the cart 104c are ready to harvest to the user computing device 852. In some embodiments, the master controller 106 may send a notification that the plants A in the cart 104c are ready to harvest to the harvester component 208. The master controller 106 may control the lighting devices not to illuminate the cart 104c in order to prevent the plants A from overgrowing. In some embodiments, if the level of chlorophyll for the plants A in the cart 104c is greater than the predetermined value, the master controller may determine that the plants A in the cart 104c are not fully grown or ripen. The master controller 106 may control the lighting devices to increase the level of illumination to the cart 104c or control the nutrient distribution component to provide more nutrients to the cart 104c to facilitate the ripening of the plants A in the cart 104c.

The present disclosure is not limited to using the level of chlorophyll. As discussed above, information resulting from the captured image such as color, shape, particular patterns, etc. may be used to discern the growth status of plants.

Figure 7:
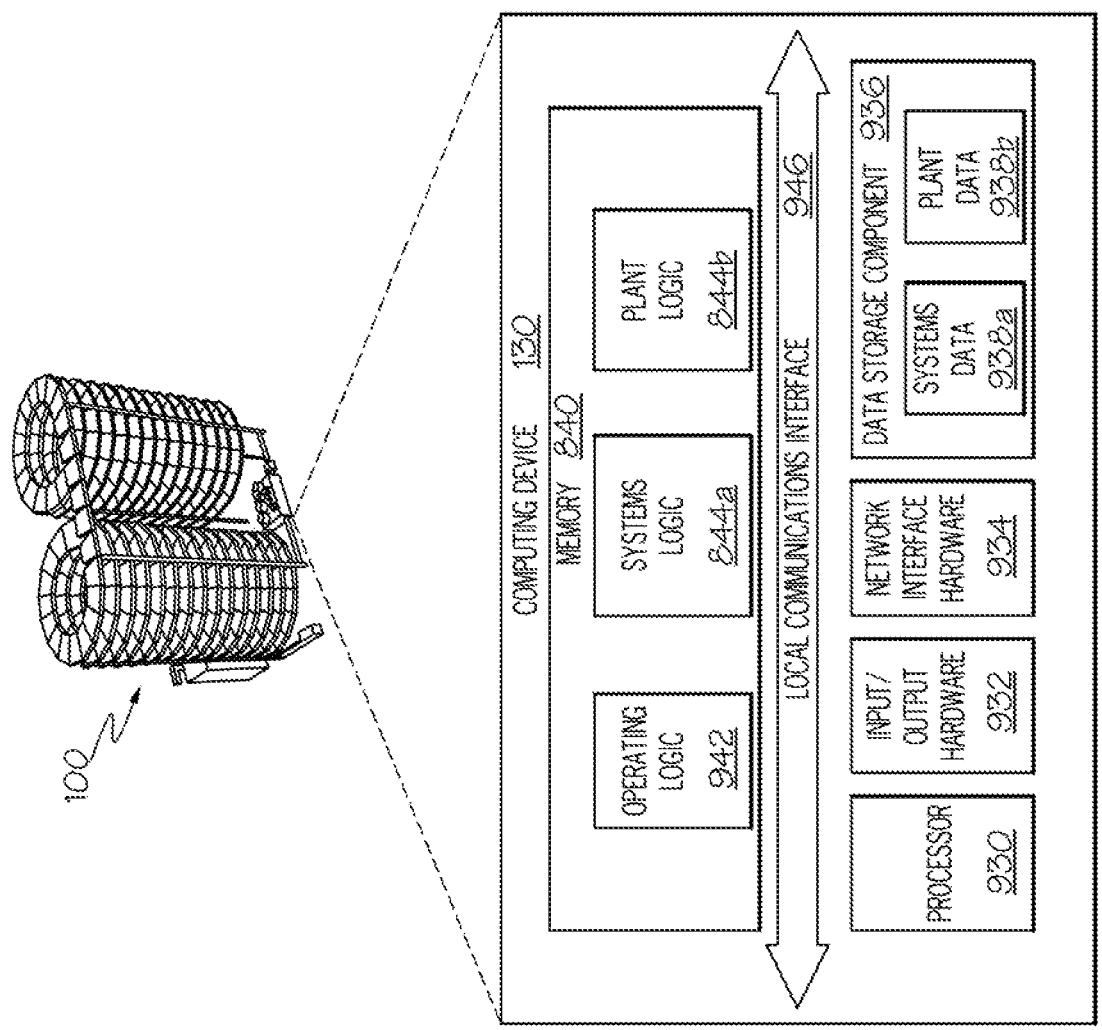
FIG. 7 depicts a computing device for an assembly line grow pod, according to embodiments described herein.

FIG. 7 depicts a computing device 130 for an assembly line grow pod 100, according to embodiments described herein. As discussed above, FIG. 7 depicts the embodiment where the master controller 106 may be implemented with the computer device 130. In some embodiments, the control module 130 may be separately configured and inserted into a modular control interface of the master controller 106 to perform the function of measuring growth status of plants and/or seeds in order to distribute processing load from the master controller 106. In some embodiments, the control module 130 may be removably inserted into the modular control interface of the master controller 106. As illustrated, the computing device 130 includes a processor 930, input/output hardware 932, the network interface hardware 934, a data storage component 936 (which stores systems data 938a, plant data 938b, and/or other data), and the memory component 840. The memory component 840 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the computing device 130 and/or external to the computing device 130.

The memory component 840 may store operating logic 942, the systems logic 844a, and the plant log is 844b. The systems logic 844a and the plant logic 844b may each include a plurality of different pieces of logic, each of which may be embodied as a computer program, firmware, and/or hardware, as an example. A local interface 946 is also included in FIG. 7 and may be implemented as a bus or other communication interface to facilitate communication among the components of the computing device 130.

The processor 930 may include any processing component operable to receive and execute instructions (such as from a data storage component 936 and/or the memory component 840). The input/output hardware 932 may include and/or be configured to interface with microphones, speakers, a display, and/or other hardware.

The network interface hardware 934 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the computing device 130 and other computing devices, such as the user computing device 852 and/or remote computing device 854.

The operating logic 942 may include an operating system and/or other software for managing components of the computing device 130. As also discussed above, systems logic 844a and the plant logic 844b may reside in the memory component 840 and may be configured to perform the functionality, as described herein.

It should be understood that while the components in FIG. 7 are illustrated as residing within the computing device 130, this is merely an example. In some embodiments, one or more of the components may reside external to the computing device 130. It should also be understood that, while the computing device 130 is illustrated as a single device, this is also merely an example. In some embodiments, the systems logic 844a and the plant logic 844b may reside on different computing devices. As an example, one or more of the functionalities and/or components described herein may be provided by the user computing device 852 and/or remote computing device 854.

Additionally, while the computing device 130 is illustrated with the systems logic 844a and the plant logic 844b as separate logical components, this is also an example. In some embodiments, a single piece of logic (and/or or several linked modules) may cause the computing device 130 to provide the described functionality.

As illustrated above, various embodiments for measuring growth of a plant in a grow pod are disclosed. These embodiments create a quick growing, small footprint, chemical free, low lab or solution to growing microgreens and other plants for harvesting. These embodiments may create recipes and/or receive recipes that dictate the timing and wavelength of light, pressure, temperature, watering, nutrients, molecular atmosphere, and/or other variables the optimize plant growth and output. The recipe may be implemented strictly and/or modified based on results of a particular plant, tray, or crop.

Accordingly, some embodiments may include a grow pod that includes a cart that houses at least one plant, a sensor configured to measure at least one of a weight, a color, and a height of the at least one plant in the cart; and a master controller configured to identify the at least one plant in the cart, receive data from the sensor, determine growth of the at least one plant based on the at least one of weight, the color, and the height, and output a notification that the plants are ready to harvest based on the growth of the plants.

As discussed in the embodiments described above, the system for measuring growth of a plant includes a plurality of carts, a group of sensors and a master controller. The plurality of carts is moving along a rail and carrying plants and seeds. The group of sensors is arranged in or around an assembly line grow pod and includes at least a weight sensor, a proximity sensor and a camera. The master controller is communicatively coupled to the group of sensors and including a processor and a memory for storing a master recipe, a plurality of threshold growth index values associated with plants, and a predetermined program. The master recipe includes a set of customized instructions that dictate a dosage supply relevant to growth of plants, seeds, or both. The predetermined program, upon execution by the processor, performs operations comprising: (i) receiving information indicative of growth state of a selected plant from the group of sensors; (ii) identifying the selected plant; (iii) retrieving a threshold growth index value associated with the selected plant; (iv) comparing the information indicative of growth state of the selected plant with the threshold growth index value; (v) determining that the growth state of the selected plant is normal, overgrowth, or undergrowth; and (vi) upon determination that the growth state of the selected plant is overgrowth, or undergrowth, modifying the master recipe accordingly.

The information indicative of growth state of the selected plant includes a weight of the selected plant, a height of the selected plant, a chlorophyll level of the selected plant, or a combination thereof. The predetermined program, upon execution by the processor, performs operations further including (i) receiving the weight of the selected plant from the weight sensor; (ii) retrieving a threshold weight index value associated with the selected plant; (iii) comparing the weight against the threshold weight index value; and (iv) determining that the growth state of the selected plant is normal, overgrowth, or undergrowth.

In another embodiment, the predetermined program, upon execution by the processor, performs operations further including (i) receiving a distance between the proximity sensor and the selected plant from the proximity sensor; (ii) determining the height of the selected plant based on the distance; (iii) retrieving a threshold height index value associated with the selected plant; (iv) comparing the height against the threshold height index value; and (v) determining that the growth state of the selected plant is normal, overgrowth, or undergrowth.

In another embodiment, the predetermined program, upon execution by the processor, performs operations further including (i) receiving a captured image the selected plant from the camera; (ii) determining the chlorophyll level of the selected plant based on the captured image; (iii) retrieving a threshold chlorophyll level index value associated with the selected plant; (iv) comparing the determined chlorophyll level against the threshold chlorophyll index value; and (v) determining that the growth state of the selected plant is normal, overgrowth, or undergrowth.

As discussed in the embodiments described above, the growth state of plants may be monitored, checked and determined. Upon determination of the growth state being normal and healthy, it is further determined that plants are ready for harvesting and to be transported to a harvest component. Upon determination of overgrowth of plants, then the master controller modifies the master recipe accordingly and controls dosage control components to modify a dosage supply to such plants to prevent or discontinue further growth of plants. Upon determination of undergrowth of plants, then the master controller modifies the master recipe accordingly and controls dosage control components to modify a dosage supply to such plants to improve growth. Accordingly, the assembly line grow pod system may not only provide individual and customized care based on the master recipe for a large number of plants but also modify the master recipe to accommodate the ongoing growth state of plants. As a result, optimal, controlled and effective care for a large number of plants may be achieved in the assembly line grow pod system discussed above.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for measuring growth of a plant in a grow pod based on a weight, a color, a chlorophyll level, and/or a height of the plant. It should also be understood that these embodiments are merely exemplary and are not intended to limit the scope of this disclosure.

What is claimed is:

1. A system for measuring growth of a plant in an assembly line grow pod, comprising:
   a plurality of carts moving along a rail and carrying plants and seeds;
   a group of sensors arranged in or around an assembly line grow pod and comprising at least a weight sensor, a proximity sensor and a camera;
   a master controller communicatively coupled to the group of sensors and comprising a processor and a memory for storing a master recipe, a plurality of threshold growth index values associated with plants, and a predetermined program, wherein the master recipe comprises a set of instructions that dictate a dosage supply customized to growth of plants, seeds, or both, and the predetermined program, upon execution by the processor, causes the system to perform operations comprising:

receiving information indicative of growth state of a selected plant from the group of sensors;

identifying the selected plant;

retrieving a threshold growth index value associated with the selected plant;

comparing the information indicative of growth state of the selected plant with the threshold growth index value;

determining that the growth state of the selected plant is normal, overgrowth, or undergrowth; and upon determination that the growth state of the selected plant is overgrowth, or undergrowth, modifying the master recipe accordingly.

2. The system of claim 1, wherein the information indicative of growth state of the selected plant comprises a weight of the selected plant, a height of the selected plant, a chlorophyll level of the selected plant, or a combination thereof.

3. The system of claim 2, wherein the predetermined program, upon execution by the processor, the system to perform operations further comprising:

receiving the weight of the selected plant from the weight sensor;

retrieving a threshold weight index value associated with the selected plant;

comparing the weight against the threshold weight index value; and determining that the growth state of the selected plant is normal, overgrowth, or undergrowth.

4. The system of claim 2, wherein the predetermined program, upon execution by the processor, performs operations further comprising:

receiving a distance between the proximity sensor and the selected plant from the proximity sensor;

determining the height of the selected plant based on the distance;

retrieving a threshold height index value associated with the selected plant;

comparing the height against the threshold height index value; and determining that the growth state of the selected plant is normal, overgrowth, or undergrowth.

5. The system of claim 2, wherein the predetermined program, upon execution by the processor, performs operations further comprising:

receiving a captured image of the selected plant from the camera;

determining a chlorophyll level of the selected plant based on the captured image;

retrieving a threshold chlorophyll level index value associated with the selected plant;

comparing the determined chlorophyll level against the threshold chlorophyll index value; and determining that the growth state of the selected plant is normal, overgrowth, or undergrowth.

6. The system of claim 1, wherein the predetermined program, upon execution by the processor, perform operations further comprising:

upon determination that the growth state of the selected plant is normal, determining that the selected plant is ready for harvesting.

7. The system of claim 1, wherein the predetermined program, upon execution by the processor, performs operations further comprising:

upon determination that the growth state of the selected plant is overgrowth, modifying the master recipe relevant to the selected plant to alter a dosage supply; and causing a dosage control component to provide the selected plant with the altered dosage supply.

8. The system of claim 6, wherein the predetermined program, upon execution by the processor, perform operations further comprising:

upon determination that the selected plant is ready for harvesting, transporting the selected plant to a harvest component.

9. An assembly line grow system for measuring growth of a plant, comprising:

a rail system;

carts moving along the rail system and carrying plants, seeds, or both;

weight sensors operable to measure weight of a payload of each cart;

a proximity sensor positioned over the carts and operable to detect an object within a predetermined distance;

a camera positioned over the carts and operable to capture an image of the plants in the carts; and a master controller communicatively coupled to the carts, the weight sensors, the proximity sensor, and the camera, and operable to:

receive information from the weight sensors, the proximity sensor, and the camera;

determine a growth state of a selected plant based on the information indicative of weight, color, height, or a combination thereof;

modify dosage supply instructions based on the growth state of the selected plant; and control a dosage supply component to provide the selected plant with a modified dosage supply by sending the modified dosage supply instructions to the dosage supply component.

10. The assembly line grow system of claim 9, wherein the master controller is further operable to:

receive data relating to a selected plant which are output from the weight sensors, the proximity sensor, and the camera; and process the data relating to the selected plant and determine weight of the payload, color, and height of the selected plant.

11. The assembly line grow system of claim 9, wherein the master controller is further operable to: based on the growth state of the selected plant, determine that the selected plant is to be transported to a harvest component.

12. The assembly line grow system of claim 9, wherein the master controller comprises a processor and a memory for storing a master recipe that contains a set of dosage supply instructions and upon determination of an overgrowth state of the selected plant, the master controller modifies the dosage supply instructions relating to the selected plant to reduce dosage.

13. The assembly line grow system of claim 9, wherein the master controller comprises a processor and a memory for storing a master recipe that contains dosage supply instructions and upon determination of an undergrowth state of the selected plant, the master controller modifies the dosage supply instructions relating to the selected plant to increase dosage.

14. The assembly line grow system of claim 9, wherein the weight sensors are arranged on the carts, or alternatively, on the rail system.

* * * * *